United States Patent [19]

Kassai

[11] Patent Number: 4,641,879
[45] Date of Patent: Feb. 10, 1987

[54] BABY CARRIAGE HOOD
[75] Inventor: Kenzou Kassai, Osaka, Japan
[73] Assignee: Aprica Kassai Kabushikikaisha, Osaka, Japan
[21] Appl. No.: 803,498
[22] Filed: Dec. 2, 1985
[30] Foreign Application Priority Data
 Dec. 12, 1984 [JP] Japan ................. 59-261970
[51] Int. Cl.[4] ........................................... B60J 9/00
[52] U.S. Cl. .................................. 296/78 A; 296/111; 135/88
[58] Field of Search ............ 296/78 A, 111; 280/647; 135/88

[56] References Cited

U.S. PATENT DOCUMENTS

| | | | |
|---|---|---|---|
| 194,061 | 8/1877 | Thompson | 135/88 |
| 208,564 | 10/1878 | Bowers | 296/111 |
| 1,200,322 | 10/1916 | Dilling | 296/78 A |
| 1,289,965 | 12/1918 | Tichnor | 296/78 A |

FOREIGN PATENT DOCUMENTS 415086 7/1910 France ................. 296/111

Primary Examiner—Robert R. Song
Attorney, Agent, or Firm—W. G. Fasse; D. H. Kane, Jr.

[57] ABSTRACT

A baby carraige hood has a support member for mounting the hood on a baby carriage body, and the support member is provided with a shaft member which extends therethrough. The hood also has at least two ribs whose ends are bunched up the shaft member in the manner of the pivot of a fan. A bracket is assembled to the support member so that it is movable axially and turnable circumferentially related to the shaft member. The bracket has one of the ribs fixed thereto and is constantly pressed against the support member by a spring member. The respective opposed surfaces of the bracket and support member are formed at their contacting region with uneven-surfaced portions adapted for removable engagement with each other. The ribs can be unfolded and folded in the manner of a fan, and the unfolded angle thereof can be adjusted to any desired angle. Further, the ribs are turnable relative to the shaft member, so that the hood can be set at any desired rotative angular position.

5 Claims, 8 Drawing Figures

BABY CARRIAGE HOOD

BACKGROUND OF THE INVENTION

1. Field of the Invention

This invention relates to a baby carriage hood which is foldable and which is versatile in the way it is used.

2. Description of the Prior Art

Generally, a baby carriage hood is used as a sunshade but is an attachment to baby carriages and should preferably be stored as compactly as possible when not in use. To the contrary, it is preferable that in use it have a sufficiently large area to shade the sun's rays over a wide range. It is a matter of course that the sun's rays come in different directions according to the direction in which the baby carriage travels during use. Further, it is also preferable for a mother, for example, who pushes the baby carriage that the child's face be visible as much as possible. Thus, the baby carriage hood should be versatile in the way it is used: it should be foldable to a small size and unfoldable to a large size or the size to which it is unfolded should be changeable and so should be the position of the hood. It is desirable that the hood meet the need of such versatility to the fullest extent.

SUMMARY OF THE INVENTION

With the above in mind, this invention has been accomplished to meet these requirements.

Accordingly, an object of the invention is to provide a baby carriage hood which is foldable and which is capable of meeting the need of versatility of use.

A baby carriage hood according to the invention has a support member for mounting the hood on a baby carriage body, said support member being provided with a shaft member which extends therethrough. The hood also has at least two hood ribs whose ends are bunched by the shaft member in the manner of the pivot of a hand-held foldable fan (or a fan which when unfolded has the shape of a sector of a circle) hereinafter referred to briefly as a fan. Further, the support member has a bracket assembled thereto so that it is movable axially and turnable circumferentially about the shaft member. The bracket has one of the ribs fixed thereto and is constantly pressed against the support member by a spring member. The respective opposed surfaces of the bracket and support member are formed at their contacting region with uneven-surfaced portions for removable engagement with each other. The ribs can be unfolded and folded in the manner of a fan, and the unfolded angle thereof can be adjusted to any desired angle. Further, the ribs are turnable relative to the shaft member, so that the hood can be set at any desired rotative angular position.

Thus, the baby carriage hood is foldable and fully meets the need of versatility of use.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
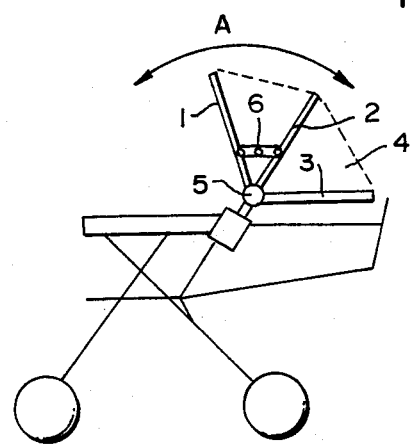
FIG. 1 is a schematic view showing an example of form in which a baby carriage hood according to the invention is attached to a baby carriage body, said hood being unfolded.

As shown in FIG. 1, a hood according to the invention has three ribs 1, 2 and 3. These ribs 1, 2 and 3 can be unfolded and folded in the manner of the ribs of a fan; in the fully unfolded state, a hood cloth 4 is spread with no slack. Further, the entire hood is turnable around the axis of a support member 5 in the direction of arrow A in FIG. 1. In addition, a folding and unfolding device 6 is installed between the ribs 1 and 2 for fixing the hood cloth 4 in its slack-free spread state.

Figure 2:
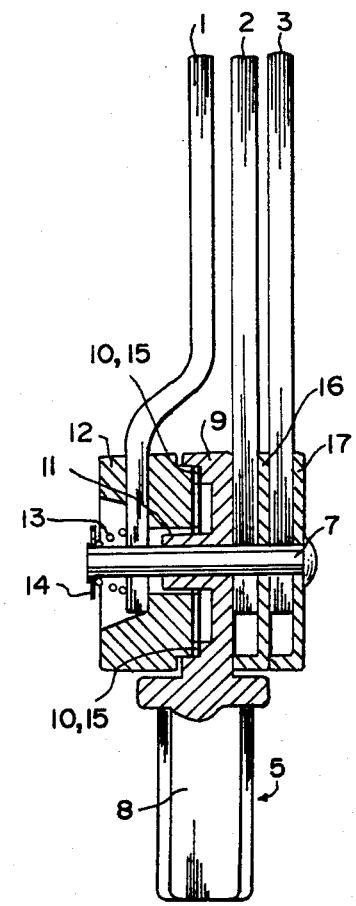
FIG. 2 is a fragmentary sectional side view showing the details of the main portions of ribs.
Figure 3:
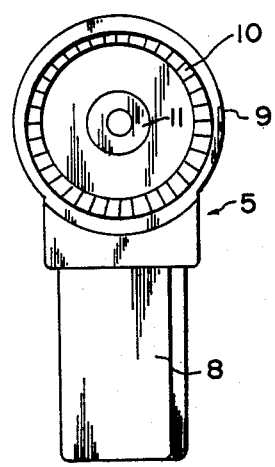
FIG. 3 is a side view showing an example of a support member according to the invention.
Figure 5:
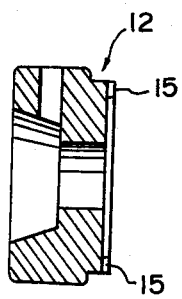
FIG. 5 is a sectional view taken along the line V—V in FIG. 4.
Figure 4:
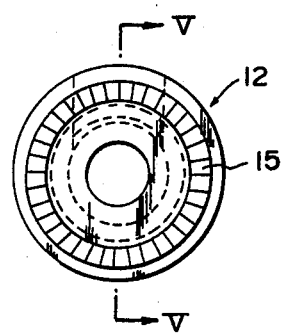
FIG. 4 is a side view showing an example of a bracket according to the invention.

As shown in FIG. 2, the three ribs 1, 2 and 3 are supported in the support member 5 through a shaft member 7. That is, the shaft member 7 is constructed in the manner of the pivot of a fan, extending through the ends of the ribs 1, 2 and 3. The lower half of the support member 5 is formed as a pile-like portion 8 which can be inserted in the baby carriage body and the upper half as a pivot portion 9. As shown in FIG. 3, one end surface of the pivot portion 9 is formed with a so-called "serrated" uneven-surfaced portion 10 on the circumference of a circle with the center at the axis of the shaft member 7. Further, the portion through which the shaft member 7 extends is formed with a boss portion 11. Assembled to the end surface of the pivot portion 9 comprising its uneven-surfaced portion 10 and boss portion 11, is a bracket 12 having an end surface adapted for engagement with the mating portion. The bracket 12 is shown in FIGS. 4 and 5. The bracket 12 has the rib 1 fitted therein, the two being fixed together for unitary movement. A coil spring 13 is mounted on the shaft member 7 and compressed between one end of the shaft member 7 and the end of the rib 1. In the drawings, 14 denotes a washer for supporting one end of the coil spring 13, the resilient force of the coil spring 13 constantly pressing the bracket 12 against the support member 5 through the rib 1. The end surface of the bracket 12 is formed with an uneven-surfaced portion 15 for engagement with the uneven-surfaced portion 10 formed on the support member 5. To describe these uneven-surfaced portions 10 and 15 in more detail, the respective inclined surfaces forming the unevenness are in the form of reversely inclined flat surfaces alternately disposed adjacent to each other to define peaks and valleys. The angle of intersection of the respective inclined surfaces is preferably about 120 degrees. Thus, when the bracket 12 or rib 1 is turned around the axis of the shaft member 7, the peaks of the bracket 12 successively pass over the peaks of the support member 5 to mesh with the valleys. At this time the bracket is moved axially relative to the shaft member 7 against the resilient force of the coil spring 13 while successively passing over the peaks or teeth of the mating member as described above.

Figure 6:
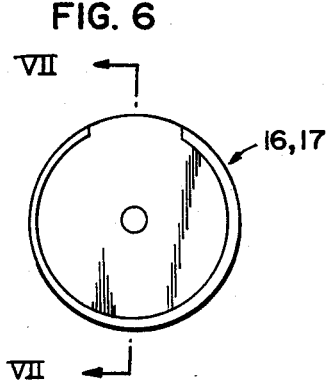
FIG. 6 is a side view showing an example of a rib cover according to the invention.
Figure 7:
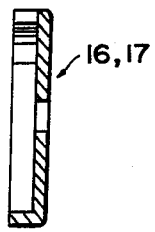
FIG. 7 is a sectional view taken along the line VII—VII in FIG. 6.
Figure 8:
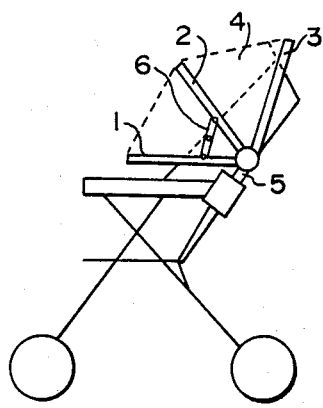
FIG. 8 is a schematic view showing another example of form to be compared with FIG. 1.

The ribs 2 and 3 are disposed on the side of the support member 5 opposite to the rib 1 and are covered at their ends with rib covers 16 and 17 shown in FIGS. 6 and 7. The end of the shaft member 7 abuts against the end surface of the rib cover 17 and is constantly pressed toward the support member 5. Thus, the rib cover 16 is pressed against the support member 5 and the rib cover 17 against the rib cover 16, so that frictional forces are produced on their contact surfaces. The ribs 2 and 3 are held at any desired rotative position or unfolded position by said frictional forces.

The baby carriage hood in the present embodiment arranged in the manner described above can be held in its position by engagement between the uneven-surfaced portions 10 and 15 irrespective of the rotative position the rib 1 assumes relative to the support member 5, and the ribs 2 and 3 can be held at any position relative to the rib 1 within the range of spread of the hood cloth 4. Therefore, the hood in its entirety is free to move in the direction of arrow A shown in FIG. 1 and can be held at the front or rear position relative to the baby carriage or at any position between said two positions. As to the unfolding angle of the hood, the hood can be set at any desired angle between the fully unfolded state and the completely folded state. For example, with the hood fully unfolded and set at the front position relative to the baby carriage and with the backrest raised, the hood can be effectively used for protection against the wind and rain.

In addition, three ribs are used in the present embodiment, but the same effect as that of the embodiment can, of course, be attained even if only two ribs are used with the rib 3 or 2 removed. Further, the uneven-surfaced portions 10 and 15 are circumferentially continuously formed on the support member 5 and bracket 12, but they may be formed at predetermined intervals.

Further, if the hood is not required, it may be removed by extracting the support member 5 from the baby carriage body.

Although the present invention has been described and illustrated in detail, it is clearly understood that the same is by way of illustration and example only and is not to be taken by way of limitation, the scope of the present invention being limited only by the terms of the appended claims.

What is claimed:

1. A baby carriage hood comprising:
   a support member for mounting said hood on a baby carriage body,
   a shaft member extending through said support member,
   at least two ribs whose ends are bunched in the manner of the pivot of a fan by said shaft member extending therethrough,
   a bracket assembled to said support member so that it is movable axially and turnable circumferentially relative to said shaft member, and
   a spring member for resiliently urging said bracket toward said support member,
   the respective opposed surfaces of said bracket and support member being formed at their assembled region with uneven-surfaced portions adapted for removable engagement with each other,
   one of said ribs being fixed to said bracket.

2. A baby carriage hood as set forth in claim 1, wherein said uneven-surfaced portions are shaped in wave form by reversely inclined surfaces which are alternately arranged, so that when said bracket is turned, the peaks of the bracket successively pass over the peaks of the support member against the pressing force of said spring member and engage the valleys thereof.

3. A baby carriage hood as set forth in claim 1, wherein the ribs except the one fixed to said bracket are pressed toward the support member by the resilient force of said spring member.

4. A baby carriage hood as set forth in claim 1, wherein there are three of said ribs, and an unfolding and folding device for fixing the unfolded angle between the ribs is provided between at least a pair of adjacent ribs.

5. A baby carriage hood as set forth in claim 1, wherein said hood is removable by extracting said support member from the baby carriage body.

6. A baby carriage hood as set forth in claim 2, wherein the ribs except the one fixed to said bracket are pressed toward the support member by the resilient force of said spring member.

* * * * *